United States Patent [19]

Vanderveen

[11] 4,047,896
[45] Sept. 13, 1977

[54] CARBON BLACK PELLET TREATMENT
[75] Inventor: John W. Vanderveen, Bartlesville, Okla.
[73] Assignee: Phillips Petroleum Company, Bartlesville, Okla.
[21] Appl. No.: 693,995
[22] Filed: June 8, 1976
[51] Int. Cl.² .............................................. C09C 1/58
[52] U.S. Cl. .................................. 23/314; 23/259.5; 62/62
[58] Field of Search .................... 23/314, 259.5, 259.6, 23/259.7, 259.8, 259.9, 313 R, 313 AS, 313 FB, 313 P; 62/62, 63, 64, 65, 1; 34/5; 241/17, 23, DIG. 13, DIG. 37

[56] References Cited

U.S. PATENT DOCUMENTS

| 2,146,902 | 2/1939 | Martin | 241/17 |
|---|---|---|---|
| 2,561,055 | 7/1951 | Hood | 23/313 X |
| 2,867,513 | 1/1959 | Boyer | 23/314 |
| 3,214,401 | 10/1965 | McKenzie et al. | 23/313 X |
| 3,285,024 | 11/1966 | Dunn et al. | 62/58 |
| 3,304,355 | 2/1967 | Pobst, Jr. et al. | 23/313 X |
| 3,347,638 | 10/1967 | Gerdes, Jr. | 23/314 |
| 3,574,951 | 4/1971 | Oetjen et al. | 34/5 X |
| 3,731,391 | 5/1973 | Schweizer | 34/5 |
| 3,909,957 | 10/1975 | Passey | 34/5 X |

OTHER PUBLICATIONS

Hawley, Condensed Chemical Dictionary, 8th Ed., p. 695, "Pigment," (1971).

Primary Examiner—Norman Yudkoff
Assistant Examiner—Barry I. Hollander

[57] ABSTRACT

By freezing wet carbon black pellets, clusters of such pellets can be easily broken apart and the frozen pellets can be submitted to a strong screening action without undue production of carbon black fines which would cause a reduction in process efficiency.

8 Claims, 1 Drawing Figure

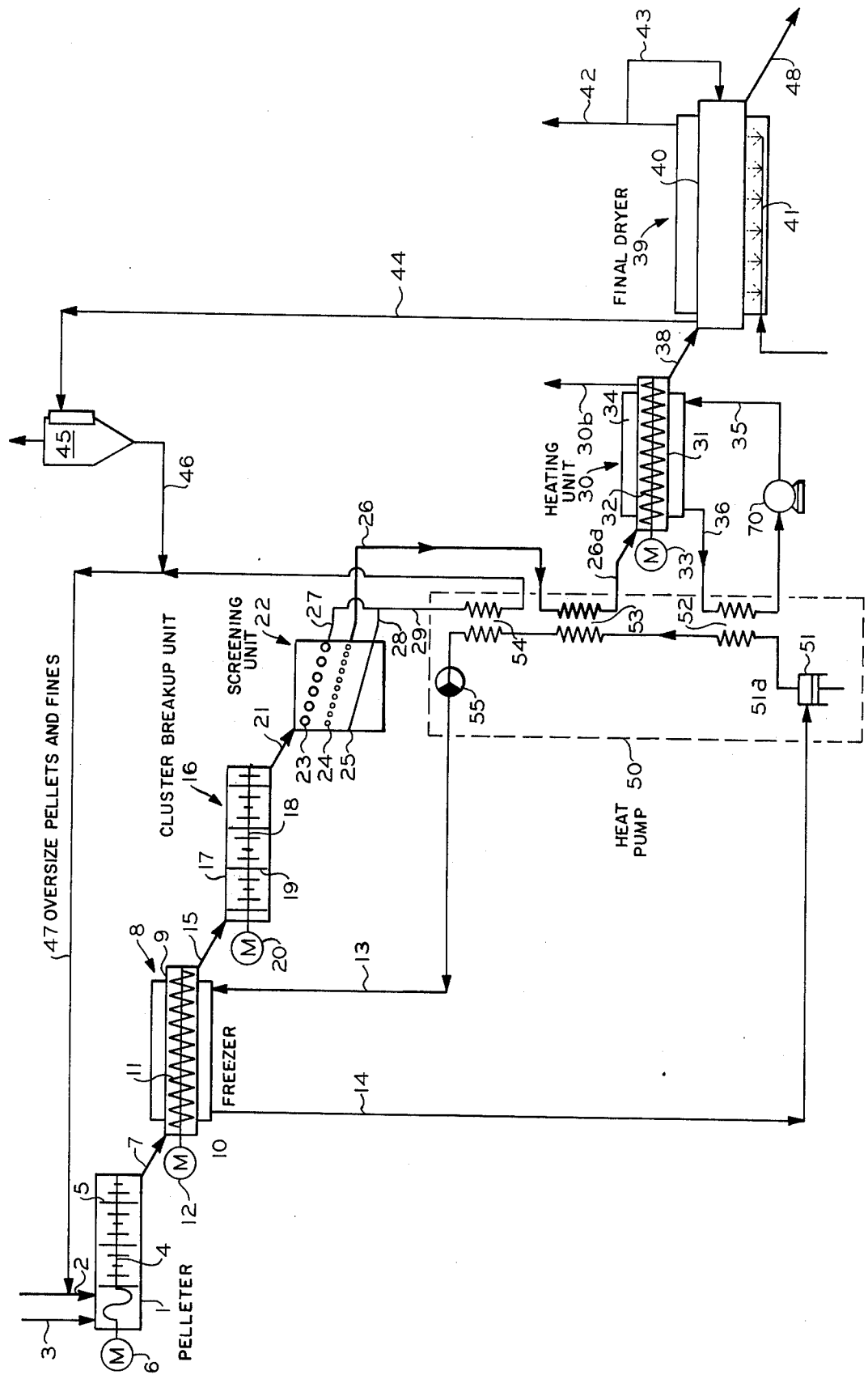

CARBON BLACK PELLET TREATMENT

This invention relates to the production of carbon black pellets. More particularly, this invention relates to the treatment and finally drying of wet carbon black pellets. Specifically, the invention relates to the production of carbon black pellets of uniform pellet size.

BACKGROUND OF THE INVENTION

It is known in the art that carbon black can be pelleted with an aqueous liquid such as to produce wet pellets. These wet pellets usually are dried and thereafter classified. The off-size pellets are recycled after they have been disintegrated. One of the problems of such a procedure is that screening the dry carbon black pellets results in a relatively high degree of carbon black fines by pulverizing and destroying the pellets during the screening action. This high degree of carbon black fines produced during a screening procedure is undesirable. On the other hand, an increase in the production of pellets of uniform pellet size remains desirable in conventional pelleting processes.

A further problem in conventional pelleting processes is that the wet carbon black pellets have a tendency of sticking together and forming clumps. These clumps have to be removed and have to be destroyed. This procedure again reduces the efficiency of the process. The clumps after being separated can be recycled. If the clumps or clusters of carbon black pellets are destroyed, e.g. by mechanical action, an increased production of carbon black fines again is the result.

THE INVENTION

It is thus one object of the invention to provide a process for the production of carbon black pellets.

Another object of this invention is to provide a process for producing highly uniform carbon black pellets.

A further object of this invention is to provide a process in which clumps or clusters of wet carbon black pellets can be separated into individual pellets without significantly affecting the pellets as such.

Yet another object of this invention is to provide a pelleting process with maximum energy efficiency.

These and other objects, advantages, details, features and embodiments of this invention will become apparent to those skilled in the art from the following detailed description of the invention, the appended claims and the drawing, which shows a schematic flow diagram for the process of treating wet pellets in accordance with this invention.

In accordance with this invention there is now provided a process for treating wet carbon black pellets which comprise freezing these wet carbon black pellets. This process has the considerable advantage that the frozen carbon black pellets can be subjected to a fairly strong screening action without undue production of carbon black fines. Furthermore, it is readily possible to break apart any clusters of carbon black pellets that might have formed during the wet pelleting process without destroying the individual pellets. Therefore, the pelleting process of this invention has a highly increased efficiency over processes not involving the freezing step mentioned.

Thus in accordance with one embodiment of this invention there is provided a process for producing carbon black pellets in which wet carbon black pellets are frozen and the frozen pellets are screened. Thereafter, the screened pellets are dried, resulting in a carbon pellet product having a uniform pellet size distribution.

In accordance with a further embodiment there is provided a process for producing carbon black pellets in which the wet carbon black pellets are frozen and the frozen carbon black pellet material is subjected to a mechanical action such as to break apart any clumps or clusters of carbon black pellets within the frozen pellet material. Preferably the carbon black pellets are subjected to a screening action while they are still frozen after the mechanical action breaking apart the pellet clusters.

During the screening of the frozen carbon black pellets, off-size carbon black material is produced. This off-size material, comprising carbon black fines as well as oversize pellets, it preferably recycled to a pelleting unit. The oversize pellets can be passed through a micropulverizer or they can be introduced as such into the pelleter.

The freezing of the wet carbon black pellets can be achieved in various manners. It is presently preferred to freeze the wet carbon black pellets by passing the wet carbon black pellet material into indirect heat exchange relationship with a cooling fluid. This cooling fluid can be provided by any standard apparatus. Preferably the cooling fluid is freon or an equivalent liquid.

The wet carbon black pellets that are frozen can be the pellets leaving a wet pelleter. If only the oversize pellets are frozen the load on the refrigeration is reduced; in this embodiment the wet carbon black pellets from the pelleter are first screened, the oversize particles are frozen, broken apart and screened; the off-specification particles are recycled whereas the pellets with the proper size are forwarded to a drying step and the dry pellets are recovered.

The frozen carbon black pellets at the end of the process are heated and dried to result in a dry carbon black pellet material. For the highest efficiency of the process of this invention, it is presently preferred to utilize the cooling side and the heating side of a heat pump in the process of this invention such as to provide the cooling liquid for freezing the carbon black pellets and also to provide a heating fluid for heating and at least partially drying the carbon black pellets. Preferably the cooling fluid of the heat pump, which is passed through a compression-heat exchange-adiabatic-expansion cycle and then used for the freezing of the pellets, is passed after the compression thereof into indirect heat exchange relationship with the heating fluid and thereafter adiabatically expanded. More preferably still the cooling fluid, having passed through heat exchange with the heating fluid, is passed through heat exchange with the frozen carbon black pellets, i.e., either the screened carbon black pellets or the off-size carbon black material or both materials.

Further preferred details and process conditions are shown in the following. These features individually or combined constitute preferred embodiments of the present invention.

The wet carbon black pellets used in the process of this invention can be made in any standard wet pelleting mill. Such a pelleting mill and a process for making such wet carbon black pellets is described, for instance, in the U.S. Pat. Nos. 3,674,437; 3,636,188; 3,391,234; and 3,333,038 (Class 23/314). The wet pellets leaving the pelleting mill usually contain 40% to 60% of water, the rest being essentially carbon black. The pellets can also contain small amounts of nitric acid or molasses, or other conventionally used additives.

During the first step of this invention, these wet pellets are frozen. Generally the pellets are cooled to a temperature below about 20° F. Preferably the pellets are cooled to a temperature in the range of about 15° F to about −20° F.

The mechanical action on the frozen pellet material in order to break apart clumps or clusters of pellets can be achieved in any stirring operation. Preferably the frozen pellet material is passed through a cylinder in which a rod with pins is rotatably arranged. Such an apparatus is similar to a pelleting mill. The breaking apart of the clusters can, however, also be done simultaneously with the screening by using a screening unit that subjects the clusters to sufficient mechanical work to break them apart.

The screening of the frozen pellets in accordance with this invention can be achieved with any usually employed screening apparatus. Thus, for instance, the apparatus of U.S. Pat. No. 3,347,638 can be utilized. Such an apparatus can, however, in accordance with this invention be operated at a higher power than is done with dry pellets. As a general rule, the screens can be vibrated up to 400 to 600 vibrations per minute.

The screened pellets and/or the pellets including the broken-apart clusters at the end of the process of this invention are heated and dried. Preferably the pellets are heated in a separate apparatus in indirect heat exchange relationship with, e.g., water vapor or other fluids. The "molten" pellets then are subjected to a final drying step which can be the same as the final drying step in standard pelleting procedures. Preferably the pellets are passed through a cylinder which is rotated and heated from the outside by burners. The flue gas by these burners can be partially passed countercurrently in contact with the drying pellets, whereby some carbon black fines may be removed from these pellets. These carbon black fines can be recycled to the pelleting operation.

The invention will still be more fully understood from the following description of the drawing.

In a pelleter 1, carbon black introduced via line 2 and an aqueous pelleting liquid introduced via line 3 are pelleted. The pelleter consists essentially of a cylindrical housing in which a coaxially extending shaft 4 having pins 3 thereon is rotated by a motor 6.

Wet carbon black pellets containing about 50 wt. % of water are introduced from the pelleter 1 via line 7 into freezer 8. This freezer 8 consists essentially of a cylindrical shell 9 around which a cooling jacket 10 is arranged. Inside of the cylinder 9 a mixing screw 11 is rotated by motor 12. The carbon black pellets are thus moved through cylinder 9 while being mixed and while contacting the inner surface of the cylinder 9 and thereby getting into direct heat exchange relationship with the cooling fluid introduced into the jacket 10 and into contact with the outer surface of the cylinder 9 via line 13. The cooling liquid is withdrawn from the jacket 10 via line 14. In the freezing unit 8, the carbon black pellets are solidly frozen.

The frozen carbon black pellets are passed from freezing unit 8 via line 15 into a cluster breakup unit 16. This cluster breakup unit 16 consists essentially of a cylinder 17 in which a shaft 18 equipped with radial pins 19 is rotatably arranged. When this shaft 18 is rotated by motor 20, the pins 19 exert mechanical work on the pellets that is sufficient to break up clusters of frozen pellets into individual pellets but which is not big enough to destroy the individual pellets. The cluster breakup unit is thermally isolated against any heat source so that the water or pelleting solution in and on the pellets stays frozen.

From the cluster breakup unit 16, the frozen pellets are passed via line 21 to a screening unit 22. This screening unit is provided with a coarse screen 23, underneath thereof a finer screen 24, and finally a collecting tray 25. All the carbon black pellets retained on the finer screen 25 are used for the further process as the product of the process in line 26. The oversize pellets are withdrawn from the screening unit 22 via line 27 and the carbon black fines collected on tray 25 are withdrawn from the screening unit 22 via line 288. These two off-size streams of carbon black, 27 and 28, are combined into an off-size product stream 29. The screened carbon black pellets in line 26 are then passed on to the heater unit 30. This heater unit 30 consists essentially of a cylinder 31 in which a conveyor and mixer screw 32 is coaxially arranged and rotated by motor 33. The cylinder 31 is surrounded by a heating jacket 34. A heating fluid, e.g., steam, is injected into this heating jacket via line 35 and withdrawn therefrom via line 36. The carbon black pellets, while moved by screw 32 through the cylinder 31, come into indirect heat exchange relationship with this heating fluid and the water in the pellets is melted. The pellets can be partially dried in the heating unit 30, if desired. Water vapor leaves unit 30 via line 300.

The now liquid water-wet carbon black pellets are withdrawn from the heating unit 30 via line 38 and passed into a final dryer 39. This dryer is a dryer commonly used for drying wet carbon black pellets and consists essentially of a rotatably arranged cylinder 40 heated from the outside, e.g., by a gas burner 41. Flue gas off this gas burner 41 is withdrawn via line 42 and a portion is passed into contact with the drying carbon black pellets via line 43. The flue gas stream 43 helps dry the carbon black pellets and withdraws some of the fines from the pelleted material. The flue gas of line 43, having entrained some of the fines, is withdrawn from the dryer 39 via line 44. This stream 44 is passed through a cyclone 45 and the carbon black fines are reintroduced into the pelleter 1 via lines 46, 47, and line 2. The finished dry carbon black pellets leave the dryer via line 48.

In accordance with the preferred embodiment of this invention, the heating liquid in lines 35 and 36, as well as the cooling liquid in lines 13 and 14, are connected thermally in indirect heat exchange relationship with each other in a heat pump 50. In this heat pump 50 the cooling fluid 14 leaving the freezing unit 8 is compressed in compressor 51, compressed cooling fluid leaves the compressor 51 via line 51a, and is passed through three indirect heat exchangers 52, 53 and 54, and is finally adiabatically expanded in an adiabatic expansion valve 55. The resulting cooled cooling fluid is then recycled via line 13 into the freezing unit 8. In the first heat exchanger 52, the cooling fluid is at a considerably higher temperature than the heating fluid in line 36. Thus in the heat exchanger 52, the compressed cooling fluid heats the heating fluid. The heated heating fluid is then recycled by pump 70 via line 35 into jacket 34 of the heating unit 30.

The thus precooled compressed cooling fluid is further cooled in heat exchanger 53 in which this cooling fluid, which is still several hundred degrees warmer than the carbon black pellets in line 26, is passed into indirect heat exchange relationship with these frozen carbon black pellets. Similarly, the cooling fluid is passed in heat exchanger 54 into indirect heat exchange relationship with the frozen off-size carbon black particles in line 29. The thus precooled cooling fluid is then expanded adiabatically in valve 55 to reach the final lowest temperatue thereof in line 13 in which the cooling fluid is partially liquid.

The temperatures of various streams are shown in the following table for a typical operation. For this typical operation, the compressor 51 compresses the cooling fluid to a pressure of about 80 to 150 psig, whereas the expansion valve 55 expands the cooling fluid to about atmospheric pressure.

TABLE

| Stream No. | Temperature |
|---|---|
| 7 | 20° C |
| 13 | −50° C |
| 14 | −15° C |
| 15 | −10° C |
| 21 | −8° C |
| 26 | −5° C |
| 26a | 0° C |
| 35 | 150° C |
| 36 | 30° C |
| 38 | 70° C |
| 48 | 204° C |
| 51a | 225° C |

In a typical operation, the various materials would flow in the various lines at rates as calculated and shown in the following table.

| Line No. | 7,15,21 | 26 | 29 | 38 | 48 | 35,36 | 13,14 |
|---|---|---|---|---|---|---|---|
| | FLOW RATES, POUNDS PER HOUR | | | | | | |
| Material | wet or frozen c.b.(1) pellets | screened frozen c.b. pellets | off-size c.b. pellets | heated c.b. pellets | dry c.b. pellets | "hot" steam | Freon-12 |
| lbs/hr | 4400(2) | 2200(3) | 2200(3) | 2200(4) | 1105(5) | 1100 lbs/hr | 8000 lbs/hr |

(1)c.b. = carbon black
(2)2200 pounds c.b., 2200 pounds water liquid
(3)1100 pounds c.b., 1100 pounds water (frozen)
(4)1100 pounds c.b., 1100 pounds water liquid
(5)1100 pounds c.b. (0.5 wt. % H$_2$O)

Reasonable variations and modification which will become apparent to those skilled in the art can be made from this invention without departing from the spirit and scope thereof.

I claim:

1. A process for producing carbon black pellets of uniform pellet size which comprises:

A. forming wet carbon black pellets by wet-pelleting carbon black with an aqueous pelleting agent,
B. freezing the resulting wet carbon black pellets so as to form a frozen carbon black pellet material,
C. breaking apart clumps and clusters of carbon black pellets contained within said frozen carbon black pellet material by subjecting said frozen carbon black pellet material to mechanical action,
D. sizing the resulting frozen carbon black pellets so as to obtain frozen carbon black pellets of essentially uniform size, and thereafter
E. drying the resulting sized carbon black pellets so as to form as a product of the process dry carbon black pellets of essentially uniform pellet size.

2. A process according to claim 1 wherein said aqueous pelleting agent is present in an amount to produce wet carbon black pellets having from 40 to 60 percent water therein.

3. A process according to claim 2 wherein said freezing step (B) is by indirect heat exchange between said wet carbon black pellets and a cooling fluid.

4. A process according to claim 3 wherein said freezing of said wet carbon black pellets is carried out at a temperature below 20° F.

5. A process according to claim 1 wherein off-size carbon black material from step (D) is recycled to step (A).

6. A process according to claim 1 wherein the mechanical action of step (C) is provided by stirring.

7. A process according to claim 1 wherein step (C) and step (D) are carried out simultaneously.

8. A process according to claim 2 wherein the wet carbon black pellets are frozen by indirect heat exchange between the pellets and a cooling fluid and wherein the sized frozen pellets are heated and dried in indirect heat exchange relationship with a heating fluid, and wherein said heating fluid is heated and said cooling fluid is cooled in one and the same heat pump utilizing indirect heat exchange between the heating fluid and the cooling fluid.

* * * * *